(12) United States Patent
Rearick

(10) Patent No.: US 10,099,753 B2
(45) Date of Patent: Oct. 16, 2018

(54) AUTOMATIC RETURN SYSTEM FOR A FLOTATION DEVICE

(71) Applicant: Kevin Rearick, Indianapolis, IN (US)

(72) Inventor: Kevin Rearick, Indianapolis, IN (US)

( * ) Notice: Subject to any disclaimer, the term of this patent is extended or adjusted under 35 U.S.C. 154(b) by 126 days.

(21) Appl. No.: 15/226,154

(22) Filed: Aug. 2, 2016

(65) Prior Publication Data

US 2018/0037303 A1 Feb. 8, 2018

(51) Int. Cl.
| | |
|---|---|
| *B63B 35/79* | (2006.01) |
| *B63H 9/06* | (2006.01) |
| *G05D 1/00* | (2006.01) |
| *G05D 1/02* | (2006.01) |

(52) U.S. Cl.
CPC ...... *B63B 35/7933* (2013.01); *B63B 35/7926* (2013.01); *B63B 35/7943* (2013.01); *B63B 35/7953* (2013.01); *B63H 9/0685* (2013.01); *G05D 1/0206* (2013.01)

(58) Field of Classification Search
CPC .......... B63H 9/0685; B63H 2009/0692; B63B 35/7979; B63B 35/73; B63B 35/79; B63B 25/12; B63B 35/285; B63B 25/08; B63B 2025/085; B63B 2213/00; B63B 35/7933; B63B 35/7926; B63B 35/7953; B63B 35/7943; B64C 31/06; B64C 2031/065; A63C 5/11; A63C 17/267; B62B 15/002; B62B 15/003; A63H 27/00; H01L 31/042; H02S 10/40; G05D 1/0206

USPC ............ 455/420, 92, 100; 114/39.13, 39.16, 114/39.18

See application file for complete search history.

(56) References Cited

U.S. PATENT DOCUMENTS

| | | | | |
|---|---|---|---|---|
| 5,589,821 | A * | 12/1996 | Sallen | ...................... G01S 13/84 340/539.1 |
| 8,035,560 | B1 * | 10/2011 | Glodz | .................... G08B 21/22 342/357.71 |
| 8,376,798 | B2 | 2/2013 | Myerscough et al. | |
| 9,262,933 | B2 | 2/2016 | Hoy | |
| 2004/0065780 | A1 * | 4/2004 | Bellacera | ............ B63B 35/7979 244/155 A |

* cited by examiner

*Primary Examiner* — Nga X Nguyen
(74) *Attorney, Agent, or Firm* — Woodard, Emhardt, Moriarty, McNett & Henry LLP

(57) ABSTRACT

A system for automatically returning a flotation device to a user when the user becomes separated from it and is greater than some predetermined distance away. The user may have a tracking device that is operable to determine its location and transmit this information to an automatic recovery unit coupled to the flotation device. The recovery unit may be configured to activate when it is greater than the predetermined distance from the tracking device, and may be operable to propel the flotation device steering it toward the tracking device to close the distance between them.

27 Claims, 6 Drawing Sheets

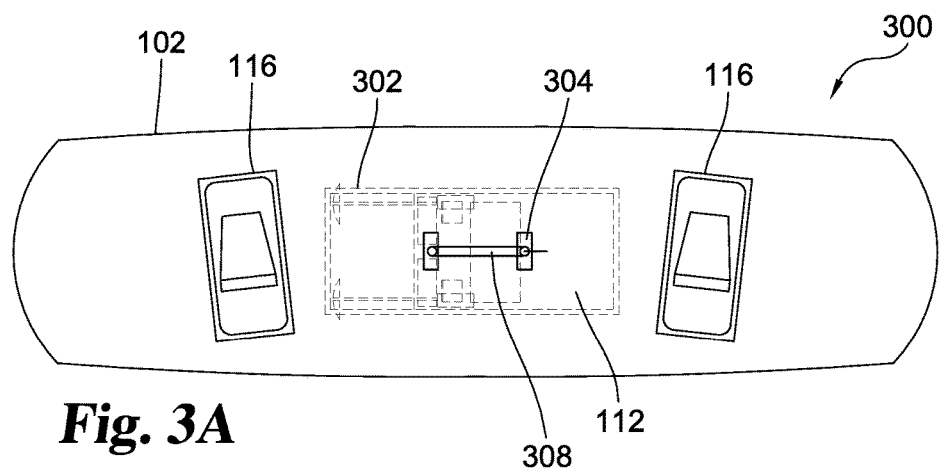
Fig. 3A
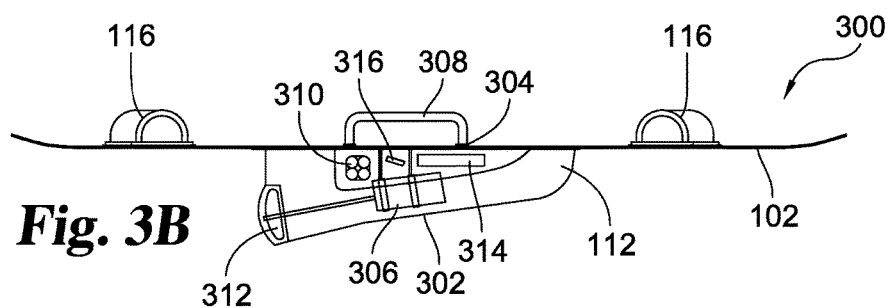
Fig. 3B
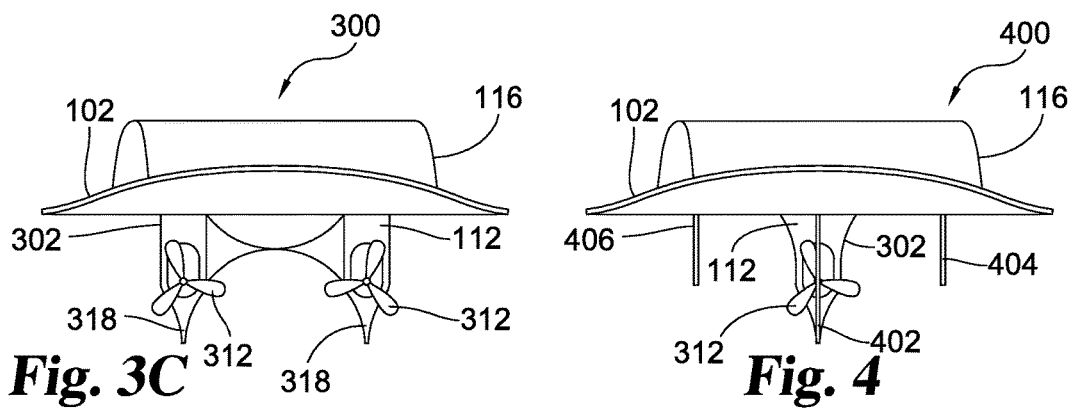
Fig. 3C   Fig. 4 ated at 100 in FIG. 1 is one example of an automatic
AUTOMATIC RETURN SYSTEM FOR A FLOTATION DEVICE

BACKGROUND

In many cases where a person is using a flotation device in water, the device may become separated from the individual. This may occur during recreational activities such as in surfing, kite boarding, water skiing, or boating where the surfboard, boat, or kite board may become separated from the user. It may also occur when a user is separated from other flotation devices such as life jackets or other life-saving equipment.

In a recreational context. this separation from the flotation device may be a simple annoyance for the user, requiring them to expend extra energy and time recovering the flotation device. In other cases, separation from the flotation device may present a life-threatening situation, such as when the flotation device is a lifeboat or life preserver that has become unreachable or continues to move further away leaving the user stranded in deep water.

SUMMARY

Generally disclosed herein is a system for automatically returning a flotation device to a user when the user becomes separated and is greater than some predetermined distance away from the flotation device. For example, the system may include a flotation device and a tracking device that may have a tracking device locator configured to determine a location for the tracking device and a transmitter configured to transmit this location to a recovery unit mounted to the flotation device. The recovery unit may include a receiver responsive to the transmitter in the tracking device that is configured to receive the location of the tracking device from the transmitter. The recovery unit may include a recovery system locator that is configured to determine a location for the flotation device, and a controller coupled to the receiver and the recovery system locator that has a processor and is configured to use the location of the tracking device and the location of the recovery unit to activate the recovery unit when the controller determines that a range between the two exceeds a predetermined threshold limit.

Other variations on the general concept of an automatic recovery system involving a flotation device including various examples, forms, features, and the like are discussed further herein.

BRIEF DESCRIPTION OF THE DRAWINGS

FIG. 3A is a top view of one example of a flotation device with an automatic recovery unit like the one shown in FIGS. 1 and 2.

FIG. 3B is a side view of the flotation device of FIG. 3A.

FIG. 3C is an end view of the flotation device of FIGS. 3A and 3B.

FIG. 4 is an end view of a flotation device with an automatic recovery unit like the one shown in FIGS. 3A-3C.

DETAILED DESCRIPTION

Figure 1:
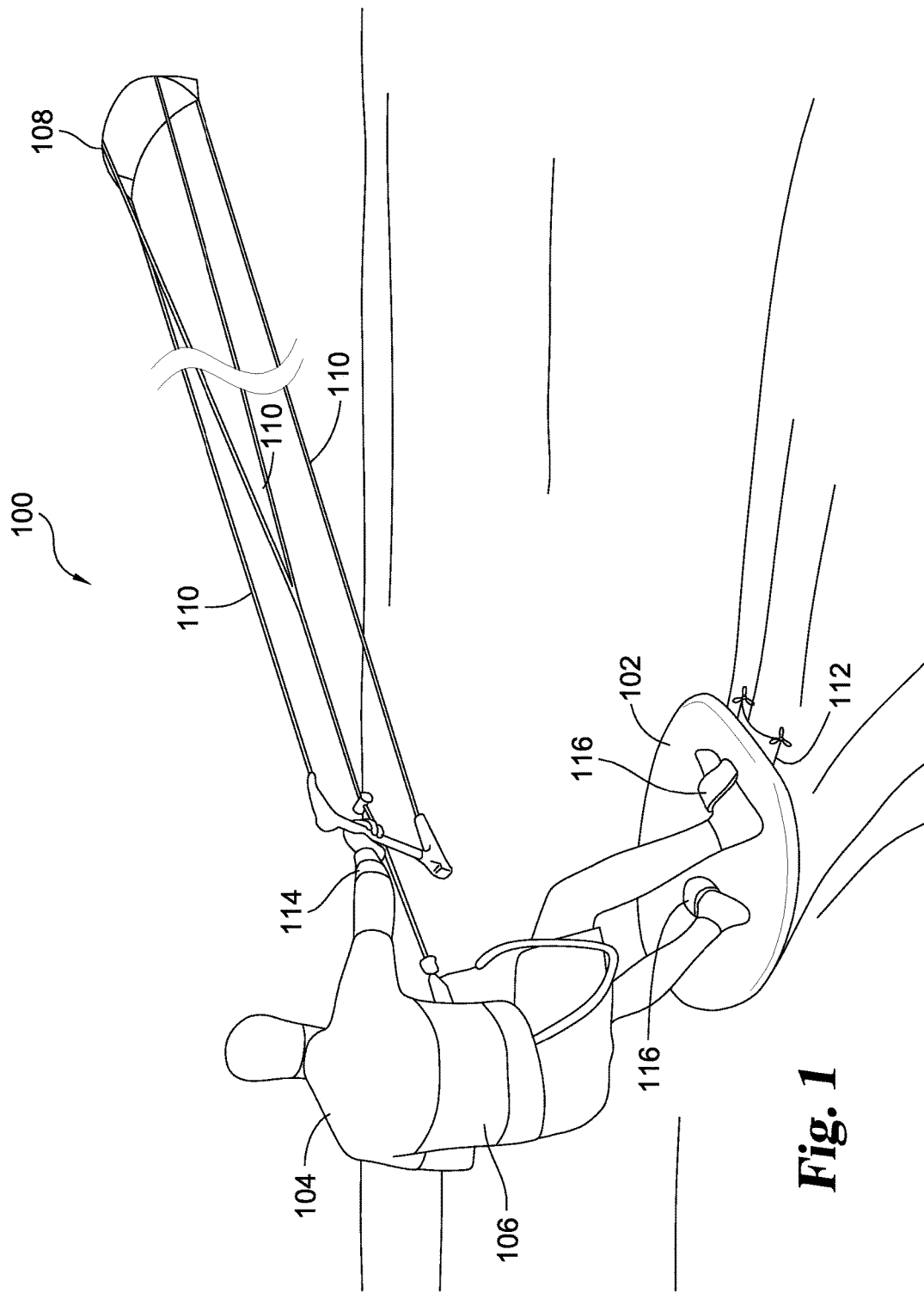
FIG. 1 is a diagrammatic view of one example of the disclosed automatic recovery system being used by a kite boarder.

Illustrated at 100 in FIG. 1 is one example of an automatic return system that includes a flotation device 102. In this example, flotation device 102 is a kite board operated by a user 104. Flotation device 102 includes retention members 116 illustrated here as stirrups positioned on flotation device 102 to correspond with and retain the user's feet to the device. A harness 106 couples user 104 to one or more control lines 110, control lines which are also coupled to a kite 108. In other words, kite 108 and flotation device 102 may be thought of as user wearable devices being coupled to user 104 via harness 106 and retention members 116 respectively.

A recovery unit 112 may be coupled to an underside or downward facing side of flotation device 102 opposite the user, and may include any suitable arrangement of sensors, controllers, batteries, motors, steering assemblies, and the like. For example, automatic return system 100 may include, or interact with, a tracking device 114, here illustrated as a user wearable device coupled to the user's arm. In general, recovery unit 112 may communicate with tracking device 114 to determine whether to automatically recover flotation device 102, and in what direction to propel it in order to do so. Such recovery may include, without limitation, determining which direction to steer flotation device 102 when activated, when to activate recovery unit 112, and when to deactivate recovery unit 112 upon arrival at the tracking device (i.e. the user). In this way, a user who is separated from a flotation device such as a kite board, surf board, life preserver, kayak, boat, etc. will find the flotation device has already automatically begun heading toward the user rather than the user being required to swim after the flotation device.

Figure 2:
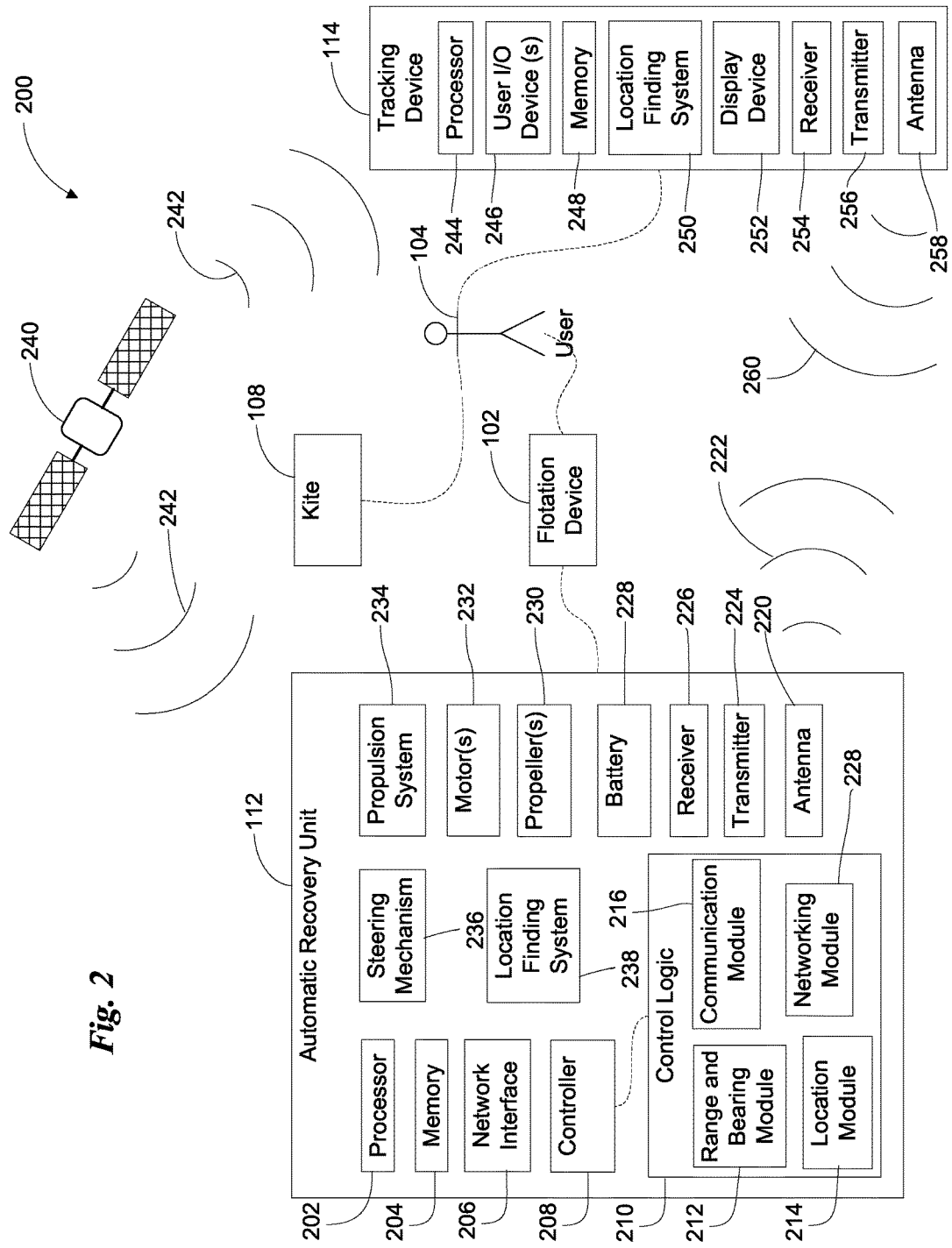
FIG. 2 is a component diagram illustrating components that may be included in an automatic recovery system like the one shown in FIG. 1

Some possible alternatives for components that may be included in an automatic return system like the system shown in FIG. 1 are illustrated at 200 in FIG. 2. Recovery unit 112 may include a processor 202 which may be programmed and/or configured to perform various operations or tasks discussed herein related to automatically returning flotation device 102 to user 104. Processor 202 may be coupled to any other useful devices such as control circuits, controllers, memory, steering or propulsion systems, and the like to perform these tasks. Memory 204 may be included for storing operating values or parameters which may include intermediate or final values of calculations, logical or computational instructions for processor 202, hardware or software control parameters, and the like.

Such control parameters may include a predetermined threshold distance for the system that may be used in determining when to automatically activate and deactivate recovery unit 112. Unit 112 may be configured accordingly to deactivate when the tracking device 114 (coupled to the user) is greater than 1 foot away, greater than 3 feet away, greater than 50 feet away, or greater than 500 feet away to name a few non-limiting examples. As discussed further herein elsewhere, this parameter may be configured by the user, or overridden by direct input from the user using an input device.

An antenna 220 may be included that is response to any suitable range of electromagnetic frequencies. Antenna 220 may thus facilitate wireless communications over a communication link like communication link 222 between tracking device 114 and recovery unit 112. This communications link appears as a wireless link in FIG. 2, but any suitable link may be used such as a wired link implemented as a cable or wire running from recovery unit 112 to tracking device 114. A networking interface 206 may be included to process communications with other devices in the system communicated using a network such as BLUETOOTH network passing packets of datagrams over communications link 222. A transmitter 224 and receiver 226 may be included and may use an antenna 220 or other suitable devices to transmit and receive location and other information between recovery unit 112 and tracking device 114.

A location finding system 238 (or "locator") may be included and may be configured to use any suitable technique for obtaining a physical location for automatic recovery unit 112. The location-finding system may use any combination of hardware and software to acquire and maintain accurate and precise positional information for recovery unit 112.

For example, location finding system 238 may determine the location of recovery unit 112 based on communications with satellite based systems such as the Global Positioning System (GPS). A receiver like receiver 226 and optionally a transmitter like transmitter 224 may use an antenna like antenna 220 to receive positional information on a communications link 242 here shown as a wireless data transmission from a satellite 240. This positional information may be used to triangulate a location of recovery unit 112. Other technologies may be used such as positional triangulation based on signals sent and/or received from cell tower transmitters and receivers that are part of a cellular network.

Adjustments to the direction of travel for recovery unit 112 may be provided by steering mechanism 236, and movement may be provided by a propulsion system 234, which may include, or control, one or more motors 232 coupled to one or more corresponding propellers 230. A battery 228 may be included to provide power to the propulsion system 234, steering mechanism 236, and processor 202 and other aspects of the recovery unit 112 that may require electrical power to operate.

A controller 208 (or "control module") may be included to control the operation of recovery unit 112. Controller 208 may be configured to initialize recovery unit 112 which may include going through a basic startup and system self-testing procedure, running through algorithms or subroutines to locate and communicate with tracking device 114, and the like. The controller may then begin one or more control loops periodically or continuously obtaining location data from location finding system 238 and tracking device 114 and determining whether to activate or deactivate recovery unit 112. Controller 208 may be coupled to (or include) other aspects shown in FIG. 2 and discussed further below such as processor 202, memory 204, network interface 206, control logic 210, propulsion system 234, motors 232, receiver 226, transmitter 224, location finding system 238, and/or steering mechanism 236. These various components may provide input to controller 208, and/or be responsive to output from controller 208 such that the controller is thus configured to control the overall operation of the automatic recovery unit.

Controller 208 may include control logic 210 which may be implemented in any suitable fashion such as by using physical control circuits configured to perform the various control functions, or as software programs executed on processor 202 and stored in memory 204. For example, a networking module 218 may include software or control circuitry for configuring controller 208 to establish and maintain communication links such as links 222 and/or 242. Networking module 218 may thus configure processor 202, network interface 206, and any other suitable hardware or software in recovery unit 112. Any suitable protocols may be supported by networking module 218 such as Transmission Control Protocol/Internet Protocol (TCP/IP), User Datagram Protocol (UDP), Ethernet protocol, or any other suitable networking protocol. Any of these protocols may be used to establish and maintain communications links 222 and/or 242.

A communication module 216 may be included in recovery unit 112. Communication module 216 may be configured to open and maintain communication links such as links 222 and 242. Communication module 216 may be configured to implement any suitable digital, analog, or other communication scheme using any suitable networking, data, or control protocol. Communication module 216 may engage or use networking module 228 to open, maintain and manage communication with other aspects of the automatic return system via network communications.

In one example, communication module 216 may be configured to automatically establish communication link 222 with tracking device 114, optionally as part of its initialization on startup. In one example, tracking device 114 may be configured to operate according to the IEEE 802.15 wireless networking standard (sometimes referred to as a "Bluetooth" or Wireless Personal Area Network or "WPAN"). In this example, communication module 216 may automatically interact directly with recovery unit 112, or via any nearby routers, switches, network repeaters or network endpoints, and the like, to establish a communications link 222. Communications module 216 may be implemented to use any combination of Generic Access Profile (GAP), Generic Attribute Profile (GATT), and/or Internet Protocol Support Profile (IPSP) protocols to acquire and maintain communications with tracking device 114.

Location module 214 may be included and may configure recovery unit 112 to collect, analyze, process, and/or maintain information in real time indicating the location of recovery unit 112. Such location information may be used by the recovery system to determine a range and bearing from recovery unit 112 to tracking device 114. Location finding module may use information provided by location finding system 238, or from any other available source to determine the location of unit 112.

Location information for recovery unit 112 from location finding system 238, and location information for tracking device 114 received via communication link 222 may be processed by range and bearing module 212 to determine a range and bearing from the location of recovery unit 112 to tracking device 114. For example, if a first location A is the location of tracking device 114, and a second location B is the location of recovery unit 112, the range and bearing module 212 may calculate the distance between A and B using Formula A:

$$d = 2r\sin^{-1}\left(\sqrt{\sin\left(\frac{\varphi_B - \varphi_A}{2}\right)^2 + \cos(\varphi_A)\cos(\varphi_B)\sin\left(\frac{\lambda_B - \lambda_A}{2}\right)^2}\right) \quad \text{Formula A}$$

where:
- $d$ is the travel distance from A to B on the surface of the earth
- $r$ is the radius of the earth (e.g. about 3,959 mi or about 6357 km)
- $\varphi_A$ is the latitude of point A (e.g. decimal number where negative sign indicates coordinates south of the equator)
- $\varphi_B$ is the latitude of point B
- $\lambda_A$ is the longitude of point A (e.g. decimal number where negative sign indicates coordinates west of the Prime Meridian)
- $\lambda_B$ is the longitude of point B In another example, the distance may be approximated using a simplified formula as show in Formula B:

$$d = \sqrt{(\lambda_B - \lambda_A)^2 + (\varphi_B - \varphi_A)^2} \quad \text{Formula B:}$$

where:
- $d$ is a scalar value representing a relative distance between A and B
- $\varphi A$ is the latitude of point A (e.g. decimal number where negative sign indicates coordinates south of the equator)
- $\varphi B$ is the latitude of point B
- $\lambda_A$ is the longitude of point A (e.g. decimal number where negative sign indicates coordinates west of the Prime Meridian)
- $\lambda_B$ is the longitude of point B Any suitable formula for calculating a value representative of the distance between recovery unit 112 and tracking device 114 may be used.

Range and bearing module 212 may also configure processor 202 and/or controller 208 to determine a direction of travel. This direction of travel may be used by controller 208 to control steering mechanism 236 and/or propulsion system 234 to direct the movements of flotation device 102 toward tracking device 114 (and user 104). Examples of range and bearing calculations are illustrated further in FIG. 6 and discussed below.

Tracking device 114 includes components that may be conceptually similar in some respects to components of automatic recovery unit 112. Generally, tracking device 114 may be any suitable device that includes the ability to determine the location of the tracking device and the ability to communicate that location to automatic recovery unit 112. Components may include a processor 244 which may be programmed and/or configured to perform various operations or tasks discussed herein related to automatically determining the location of the tracking device and sending this information to automatic recovery unit 112. Processor 244 may be coupled to any other useful devices such as control circuits, memory, and the like to perform these tasks. Memory 248 may be included for storing operating values or parameters which may include intermediate or final values of calculations, logical or computational instructions for processor 244, a log or history of locations maintained over time, or hardware or software control parameters.

An antenna 258 may be included to facilitate wireless communications over a communication link like communication link 260 between tracking device 114 and recovery unit 112. This communications link appears as a wireless link in FIG. 2, but any suitable link may be used such as a wired link facilitated by a cable or wire running from recovery unit 112 to tracking device 114. Tracking device 114 may be configured to automatically communicate information to automatic recovery unit 112 using a network such as BLUETOOTH network passing packets or datagrams over communications link 260. A transmitter 224 and receiver 226 may be included and may use an antenna 220 or other suitable devices to transmit and receive location and other information between recovery unit 112 and tracking device 114.

A location finding system 250 (or "locator") may be included and like location finding system 238, system 250 may be configured to use any suitable technique for obtaining a physical location for tracking device 114. The location-finding system may use any combination of hardware and software to accomplish the goal of maintaining accurate and precise positional information.

For example, location finding system 250 may determine the location of tracking device 114 based on communications with satellite based system such as GPS. A receiver like receiver 254 and optionally a transmitter like transmitter 256 may use an antenna like antenna 258 to receive positional information on a communications link 242 here shown as a wireless data transmission from a satellite 240. These signals may be used to triangulate a location of tracking device 114. Any suitable location finding technology or system may be used.

A display device 252 may be included for displaying a user interface such as a Graphical User Interface (GUI) generated by tracking device 114. The GUI may include graphical controls for managing or maintaining aspects of tracking device 114 and/or other components of the system such as for changing operational parameters of automatic recovery unit 112. For example, the GUI may be configured with controls for changing the threshold distance the automatic recovery unit uses in determining when to automatically activate and deactivate the recovery unit. In another example, the GUI may be configured with controls for accepting input from user 104 indicating a user-defined direction of travel, speed, and the like for automatic recovery unit 112. Display device 252 may be a touchscreen configured to perform these or other tasks using any suitable configuration of text, graphics, and/or GUI controls such as check boxes, drop-down lists, text fields, buttons, and the like useful for accepting input and displaying output. User I/O devices 246 may be used to adjust these parameters as well and may include any suitable components for accepting input from a user such as buttons, knobs, switches, and the like.

The components illustrated in FIG. 2 are represented as conceptual or logical aspects of the system and may, or may not, indicate physical couplings, attachments, or associations between various parts. For example, controller 208 may physically include a processor, memory, network interface, and control logic or any combination thereof. In another example, processor, memory, and networking module may be physically separate from controller 208 but may interact with circuitry and/or control logic in controller 208 to control motors, receivers and transmitter, or any suitable combination of aspects shown. In another aspect, control logic 210 may be a control board with circuits configured to perform actions described herein, control logic 210 may be a software program configuring controller 208 and/or processor 202 to process input and control automatic recovery unit 112 accordingly. In yet another example, propulsion system 234 may be separate individual systems or devices, or functionally integrated together as a single apparatus providing storing and propulsion aspects. In another example, display device 252 may be a touch screen configured to accept user input and display output thus making it conceptually both a user I/O device 246 as well as a display device 252. Also, though not all physical connections between components are shown in FIG. 2, any component(s) may be coupled together physical, electrically, electromagnetically, or in any other suitable fashion to implement the disclosed system.

One example of a flotation device with a recovery system is illustrated at 300 in FIGS. 3A-3C, and at 400 in FIG. 4. Here, flotation device 102 includes retention members 116 and automatic recovery unit 112. In this example, recovery unit 112 may include a housing 302 for containing motors, controllers or control circuits, batteries, and other aspects of recovery unit 112. Housing 302 may be thought of as including a hull or hull portion of recovery unit 112. In another aspect, housing 302 may be hermetically sealed to keep water and other contaminants from affecting the circuits and devices contained inside.

A mounting or attachment assembly 304 may also be included and configured to couple recovery unit 112 to flotation device 102. Assembly 304 may include any suitable fasteners, adhesives, and the like useful for maintaining flotation device 102 and adjacent to housing 302 and recovery unit 112 in general. Assembly 304 may be configured to selectively couple and uncouple recovery unit 112 from flotation device 102 allowing the unit 112 to be separated from the flotation device for transportation, storage, and the like, or if a user desires to use flotation device 102 without the recovery unit. A handle 308 may be included with assembly 304 and/or recovery unit 112 to assist in handling the recovery unit.

An example of some components that might be mounted to housing 302 are illustrated in FIG. 3B where a motor 306 may be mounted inside housing 302 and configured to rotate a propeller 312, here mounted to a rear or aft portion of housing 302. Motor 306 and propeller 312 may be thought of as part of a propulsion system configured to propel flotation device 102 as needed (e.g. toward the user when the user is separated from the flotation device). Also shown is a control board 316 which may include a processor, memory, and/or other circuitry for controlling motor 306. A communications interface board 314 may be included and may be a circuit board with antenna, transmitter, and/or receiver circuitry configured to send, receive, and process data sent and/or received over communications links with other aspects of the system such as tracking device 114. For example, this data may include location information sent to or received from satellites, such as satellites 240, from tracking device 114, and/or from other sources.

Housing 302 may be configured to include other features such as fin or strake portions 318 extending away from housing 302 and flotation device 102. These portions may be configured to align fluid flow longitudinally along a long axis of flotation device 102 to aid in steering when automatic recovery unit 112 is activated, and/or to provide additional stability and control for the user whether recovery unit 112 is active or not. Housing 302 may be formed into any suitable shape or arrangement and may include a "double hull" or "catamaran" configuration as shown in FIG. 3C. In one example, motor(s) 306, battery 310 and propellers 312 coupled to motor 306 may be thought of as a propulsion system responsive to the controller that is configured to propel the flotation device toward tracking device 114 when the automatic recovery unit 112 is activated. As illustrated, housing 302 may include multiple motors 306 coupled or electrically connected to batteries 310 and/or multiple propellers 312, each propeller corresponding to each motor, or alternatively, both propellers driven by a single motor. In the case of multiple motors 306, the controller may be configured to separately control the first and second motors to steer the flotation device as directed by the controller (e.g. toward the tracking device 114). For example, when the controller calculates a left turn, the controller may control a left side motor to slow its rotational speed with respect to a right side motor, or to reverse direction of rotation for the left side motor with respect to the right side motor. A similar operation may be implemented to execute a right-hand turn by slowing rotation or reversing the right side motor with respect to the left side motor.

As illustrated in FIG. 4 at 400, housing 302 may be configured as a "single hull" device optionally including one or more stabilizing members 404 and 406 which may be included to enhance stability and directional control. Like fin portions 318, stabilizing members 404, 406 may be configured to align fluid flow longitudinally along a long axis of flotation device 102 to aid in steering when automatic recovery unit 112 is activated, and/or to provide additional stability and control for the user regardless of whether recovery unit 112 is active or not. A steering member or "rudder" 402 may be included and may be mounted aft of a single propeller 312 as shown, on an aft portion of stabilizing members 406 and 404, or in any other suitable location on automatic recover unit 112. Steering member 402, stabilizing members 404 and 406, and/or housing 302 may be thought of as a steering mechanism responsive to the controller wherein the controller is configured to use directional input from tracking device 114 to direct the flotation device 102 using the steering mechanism when the recovery unit 112 is activated. The "single hull" housing 302 may include multiple motors 306 coupled or electrically connected to batteries 310 and/or multiple propellers 312, each propeller corresponding to each motor, or alternatively, both propellers driven by a single motor. In the case of multiple motors 306, the controller may be configured to separately control the first and second motors in concert with one or more steering members 402 to steer the flotation device as directed by the controller (e.g. toward the tracking device 114). For example, when the controller determines a left-hand turn is required, steering member 402 may be controlled to deflect or rotate so as to direct passing fluid left thus affecting a change in course to the left. Similarly, a right-hand turn may be affected by deflecting steering member 402 to the right.

Communications interface board 314 and control board 316 may be thought of separately or collectively as a "controller" like the one illustrated in FIG. 2 having control logic, memory, a processor, location finding subsystems or circuits, and/or a network interface, and the like. For example, the "controller" or "control related" aspects of the automatic recovery unit 112 and the tracking device 114 discussed herein may be coupled to receiver and recovery system locator, and may include a processor, wherein the controller is configured to use the location of tracking device 114 and the location to automatic recovery unit 112 to activate the recovery unit when the controller determines that a range to the tracking device 114 from the recovery unit 112 exceeds a predetermined threshold limit (e.g. range is greater than 1 foot, greater than 5 feet, greater than 100 feet, or more). This predetermined threshold may be programmed into the controller based on user input accepted from an input device of a personal computing device such as a tablet computer, smart phone, or desktop computer. In another example, the predetermined threshold may be stored in the controller by accepting user input using an input device mounted to automatic recovery unit 112. Such an input device may include one or more buttons, switches, displays, or other such device configured to accept user input changing the predetermined threshold distance.

In another aspect, the controller may be configured to use the location of tracking device 114 and the location of the recovery unit 112 to determine a direction of travel for the flotation device from the location of the recovery unit to the location of the tracking device when the recovery unit is activated, or about to be activated. One example of this type of directional computation appears in FIG. 6 and is described in additional detail herein elsewhere. The controller may be configured to control the steering device in accordance with this calculated direction of travel. This may include adjusting the rotational speed of one or more motors, or changing an angle of deflection for a steering member, or any other suitable method of directing flotation device 102.

Figure 5:
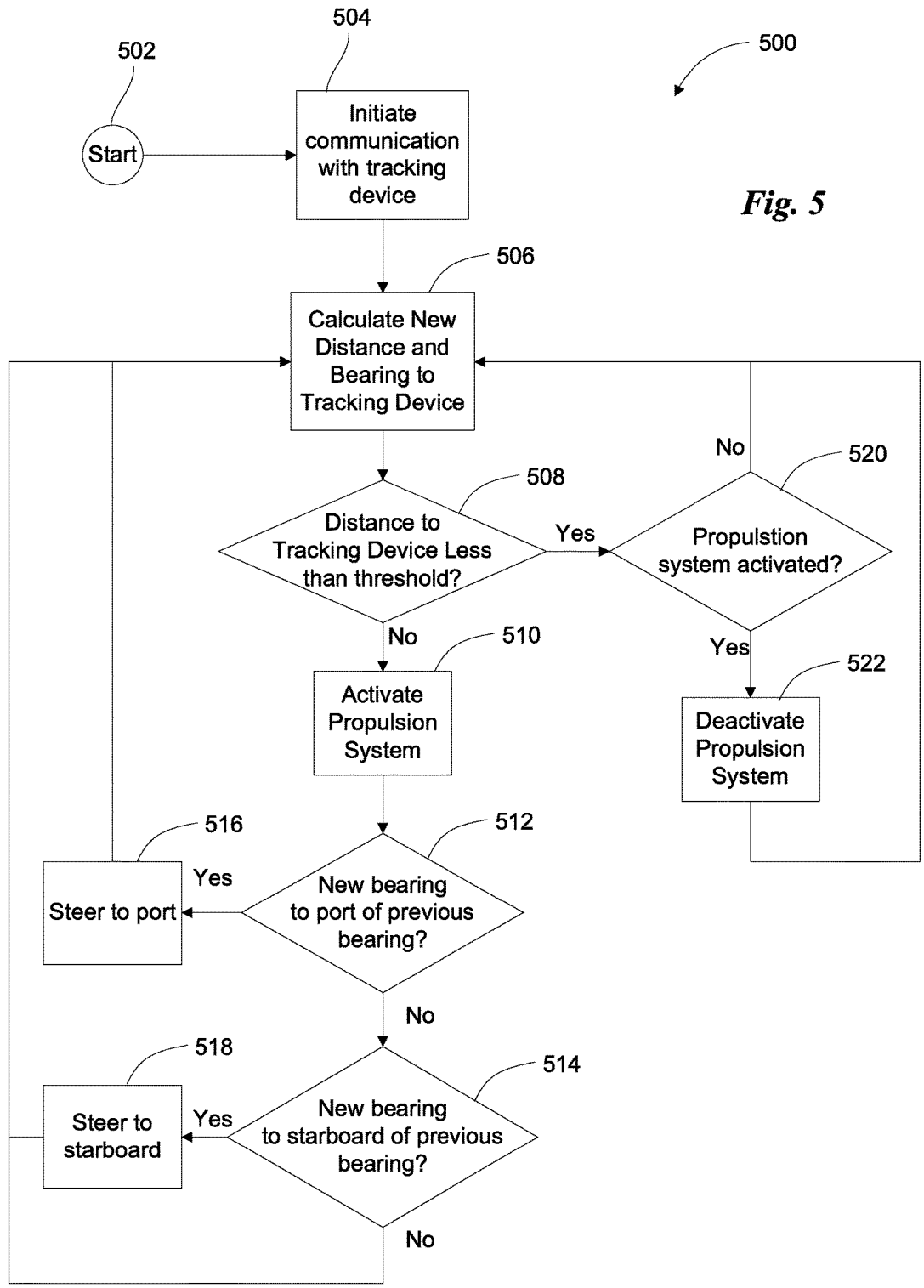
FIG. 5 is a flow diagram illustrating one example of actions that may be taken by control logic in an automatic recovery unit like the one illustrated in the preceding figures.
Figure 6:
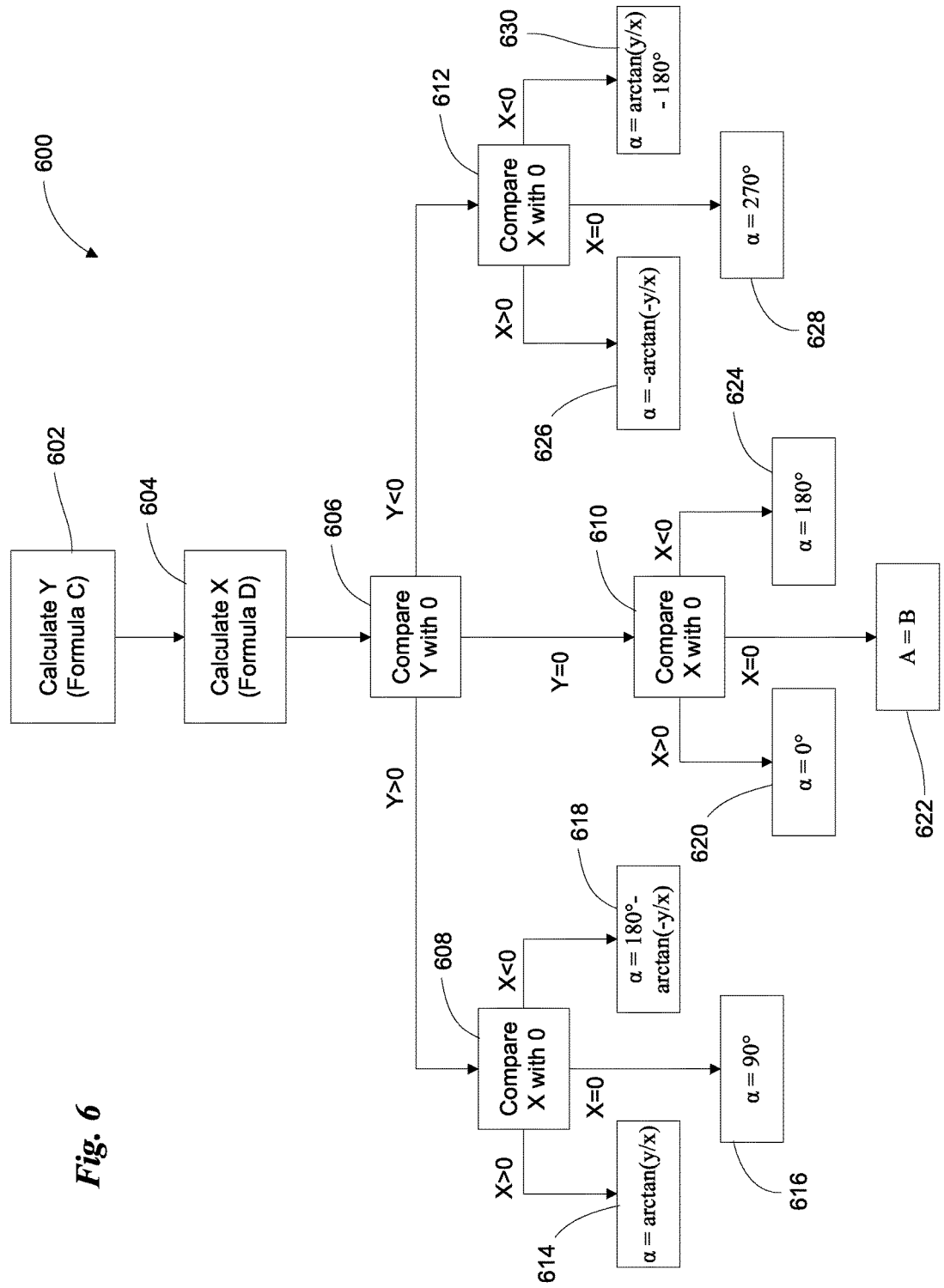
FIG. 6 is a flow diagram illustrating additional details for actions that may be taken by control logic in an automatic recovery unit like the one illustrated in the preceding figures.

One example of actions that may be taken by a system like system 100 in operation is illustrated in FIG. 5 at 500 and in FIG. 6 at 600. Starting at 502 in FIG. 5, the system may initiate communication between the tracking device and the recovery unit at 504. This action may involve establishing communication links 222 and/or 260 and may include accepting input from a user indicating that one or both devices temporarily operate in a discovery mode. For example, the tracking device 114 may be put in discovery mode by accepting input from a user using an input device. Discovery mode may also involve accepting other identifying input from a user such as a password, PIN, finger print, or other credentials. Discovery mode may include either device (or both) sending and/or receiving a collection of data or "profile" to the other device using communication links 222 and/or 260. This profile may be configured to provide to the receiving device(s) definitions of possible applications and general behaviors defining aspects of the data being exchanged such as type, size, quantity, transmission rate, and transmission protocol. Other initialization activities may include self-diagnostic tests, signal strength calculations for signals passed between tracking device 114 and recovery unit 112, remaining battery charge calculations, and the like.

At 506, recovery unit 112 may calculate a distance and bearing to tracking device 114. These calculations may be carried out using any suitable formula by hardware or software such as controller 208 using range and bearing module 212. As discussed above, a range calculation may be performed according to any suitable method such as those shown in Formulas A and B. A bearing calculation may similarly be determined using any suitable formulas, control logic, or any combination thereof.

One example of an algorithm for calculating a bearing from the recovery unit 112 to tracking device 114 is illustrated in FIG. 6 at 600. For example, if a first location A is the location of tracking device 114, and a second location B is the location of recovery unit 112, the range and bearing module 212 may calculate the bearing from B to A using Formulas C and D below. At 602, an intermediate "Y" value representing a difference in latitude between points A and B may be calculated according to Formula C:

$$y = \sin(\lambda_B - \lambda_A)\cos(\varphi_B) \qquad \text{Formula C:}$$

where:
  y is a scalar intermediate value representing a difference in latitude between A and B $\varphi_B$ is the latitude of point B (e.g. decimal number where negative sign indicates coordinates south of the equator)

$\lambda_A$ is the longitude of point A (e.g. decimal number where negative sign indicates coordinates west of the Prime Meridian)

$\lambda_B$ is the longitude of point B

At 604, an intermediate "X" value representing a difference in longitude between points A and B may be calculated according to Formula D:

$$x = \cos(\varphi_A)\sin(\varphi_B) - \sin(\varphi_A)\cos(\varphi_B)\cos(\lambda_B - \lambda_A) \qquad \text{Formula D:}$$

where:
  x is a scalar intermediate value representing a difference in longitude between A and B $\varphi_A$ is the latitude of point A (e.g. decimal number where negative sign indicates coordinates south of the equator)

$\varphi_B$ is the latitude of point B $\lambda_A$ is the longitude of point A (e.g. decimal number where negative sign indicates coordinates west of the Prime Meridian)

$\lambda_B$ is the longitude of point B

The controller may use the values of X and Y as illustrated in the algorithm illustrated in FIG. 6 to determine angle "α" which represents the bearing or deflection angle from B (the location of the recovery unit) to A (the location of the tracking device). The value for Y may be compared at 606 with a zero value. If Y is greater than zero, X is compared with zero as well at 608. If X is greater than zero at 614, α=arctan(y/x). If X is equal to 0 at 616, α=90 degrees (e.g. the tracking device is right of the recovery device). If X is less than zero at 618, α=180−arc tan(−y/x).

In the case where Y is greater than zero at 606, X is compared with zero at 610. If X is greater than zero, α=0 degrees (e.g. the tracking device is directly ahead of the recovery device). If X is equal to 0 at 622, A and B are the same location. In this case, the recovery device may not need to activate because the tracking device is currently with the flotation device. If X is less than zero at 624, α=180 degrees (e.g. the tracking device is directly behind the recovery device).

In the case where Y is less than zero at 606, X is compared with zero at 612. If X is greater than zero, α=−arc tan(−y/x). If X is equal to 0 at 628, α=270 degrees (e.g. the tracking device is left of the recovery device). If X is less than zero at 630, α=arc tan(y/x)−180.

The controller determines at 508 whether the distance between the recovery unit 112 and tracking device 114 is less than the predetermined threshold value. In other words, it determines whether the user has become separated from the flotation device, in what direction the recovery device should direct the flotation device to travel in order to intercept the user and whether the separation is sufficient to warrant activating the recovery device. If so, the controller may activate the propulsion system at 510, and steer to port at 516 using the steering mechanism if the new bearing is to port of the previous bearing (at 512), or steer to starboard at 518 using the steering mechanism if the new bearing is to starboard of the previous bearing (at 514). Logical control may return to 506 where a new distance and bearing from the recovery unit to the tracking device may be calculated.

If the controller determines that the distance to the tracking device is less than the predetermined threshold at 508, the controller may determine whether the propulsion system is active at 520. If so, the controller may deactivate the propulsion system at 522. If not, the controller may return processing to 506 where a new range and bearing calculation may be made at 506.

This control logic illustrated in FIGS. 5 and 6 may be repeated multiple times per minute, or per second, or at any other suitable rate. For example, the controller may execute the illustrated processes at intervals that are less than a millisecond apart, at intervals that are less than half a second apart, at intervals that are less than a minute apart, or at intervals that are equal or greater than a minute apart.

Figure 7A:
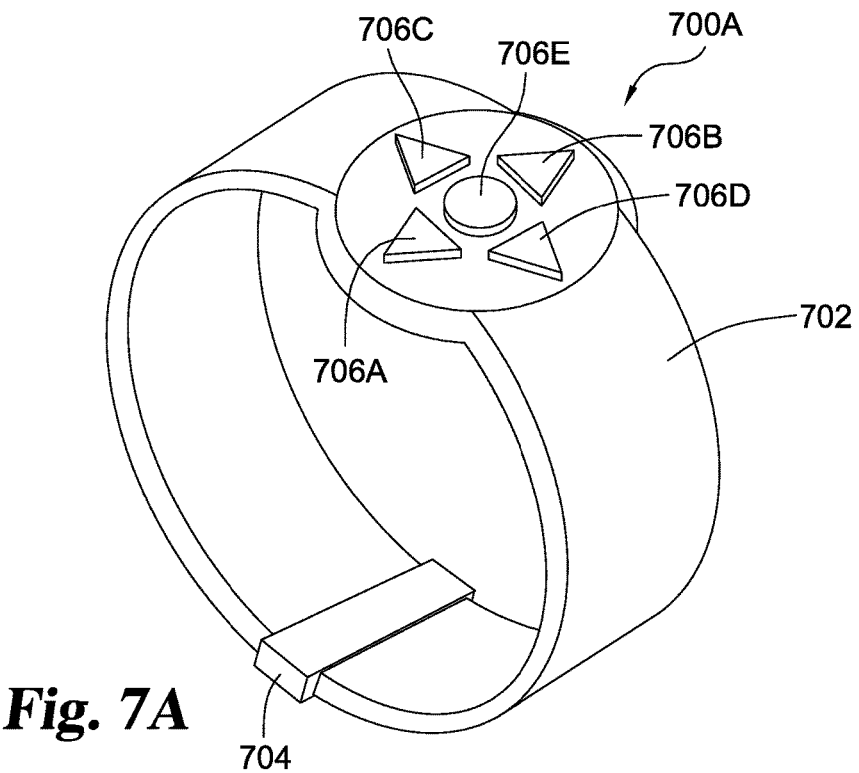
FIG. 7A is a perspective view of one example of a tracking device like the one shown in FIGS. 1 and 2.
Figure 7B:
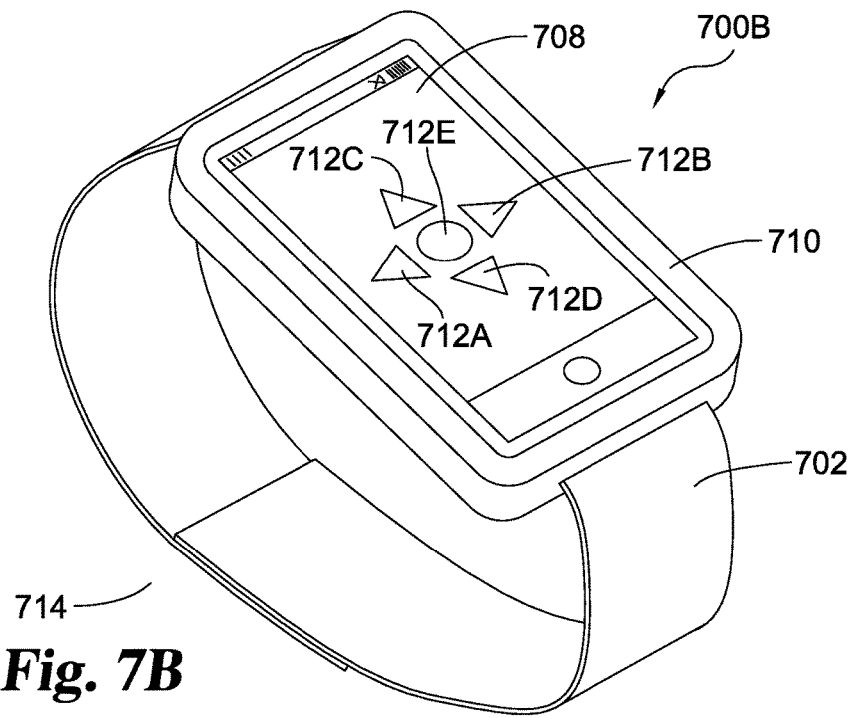
FIG. 7B is a perspective view of another example of a tracking device like the one shown in FIGS. 1 and 2.

Examples of a user wearable tracking device 114 are illustrated in FIGS. 7A and 7B. At 700A in FIG. 7A is illustrated an example of a tracking device as discussed herein elsewhere that may include a coupling member 702 here illustrated as having a band like an armband, ankle band, watch band, or other device for coupling tracking device 700A to a user of a flotation device like flotation device 102. Coupling member 702 may include a latching device or latching assembly 704 configured to selectively maintain separate portions of coupling member 702 together so as to keep the tracking device with the user or the user's clothing while allowing it to be selectively removable.

Tracking device 700A may include an input device 706, here illustrated as one or more buttons configured to accept input from a user. This input may be in the form of pressing a first button 706A configured to send a signal to the automatic recovery unit overriding its default control logic and indicating to the automatic recovery device that the user would like the recovery device to turn left. A similar method of controlling the automatic recovery device to turn right may be used as well in conjunction with button 706B. A user may control the recovery device to speed up by pressing button 706C, slow down by pressing button 706D, or to selectively activate or deactivate the recovery unit by pressing button 706E. User input of this kind may be transmitted to the recovery device over a communications link such as communications link 260 in any suitable form or format using any suitable protocol. One example of such a protocol is the BLUETOOTH protocol or any of its variations.

In another example, tracking device 700B appears in FIG. 7B as a personal computing device such as a smart phone that includes an input device 708 shown here as a touch screen. One or more button controls 712 or other such graphical controls may be configured to display on the touch screen as part of a Graphical User Interface (GUI), and input device 708 may accept input from a user accordingly. This input may be in the form of pressing a first button control 712A that is configured by software executing on the tracking device 700B to send a signal to the automatic recovery unit overriding its default control logic and indicating to the automatic recovery unit to turn left. A similar method of controlling the automatic recovery unit to turn right may be used as well in conjunction with button control 712B. A user may control the recovery unit to speed up by pressing button control 712C, slow down by pressing button 712D, or to selectively activate or deactivate the recovery unit by pressing button 712E. User input of this kind may be transmitted to the recovery unit over a communications link such as communications link 260 in any suitable form or format using any suitable protocol supported by the tracking device 700B, one example of which is the BLUETOOTH protocol or any of its variations.

Tracking device 700B may include a hermetically sealed case 710 for keeping the device from experiencing the adverse effects of water, sand, or other potentially damaging contaminants. Also shown at 700B is another example of a coupling member 702 here illustrated as a band such as an armband, ankle band, watch band, or other such device for coupling tracking device 700A to a user of a flotation device like flotation device 102. Coupling member 702 may include a retention portion 714 which may be configured to selectively maintain separate portions of coupling member 702 together so as to keep the tracking device with the user or the user's clothing while allowing it to be selectively removable as well. Retention portion 714 may be include a clasp like the one shown at 704 in FIG. 7A, or it may include one or more opposing surfaces of coupling member 702 retained together by Velcro, by oppositely polarized magnets, by buttons or snaps, or by any other suitable means.

The concepts illustrated and disclosed herein include, or may also be configured according to, any of the following numbered, non-limiting examples:

Example 1

A system, comprising a flotation device;
a kite configured for use with the flotation device;
a tracking device comprising a tracking device locator configured to determine a first location for the tracking device and a transmitter configured to transmit the first location;
a recovery unit mounted to the flotation device, the recovery unit comprising a receiver responsive to the transmitter and configured to receive the first location from the transmitter, a recovery system locator configured to determine a second location for the flotation device, and a controller coupled to the receiver and the recovery system locator, the controller having a processor, wherein the controller is configured to use the first and second locations to activate the recovery unit when the controller determines that a range to the first location from the second location exceeds a threshold limit.

Example 2

The system of Example 1, wherein the recovery unit comprises a steering mechanism responsive to the controller;
wherein the controller uses the first and second locations to determine a direction of travel for the flotation device from the second location to the first location when the recovery unit is activated; and
wherein the controller controls a steering device in accordance with the direction of travel.

Example 3

The system of any preceding Example, wherein the recovery unit comprises a propulsion system responsive to the controller that includes a motor, a battery, and a propeller, the battery and the propeller coupled to the motor;
wherein the propulsion system is configured to propel the flotation device toward the first location when the recovery unit is activated.

Example 4

The system of any preceding Example, wherein the recovery unit comprises a propulsion system responsive to the controller that includes a first motor, a battery, and a propeller, the battery and the propeller coupled to the first motor;

wherein the propulsion system is configured to propel the flotation device when activated by the controller.

Example 5

The system of any preceding Example, wherein the propulsion system comprises a second motor coupled to the battery and to a second propeller;
wherein the controller is configured to separately control the first motor and the second motor to steer the flotation device toward the first location.

Example 6

The system of any preceding Example, wherein the controller is configured to control a rotational speed of the first motor.

Example 7

The system of any preceding Example, wherein, the tracking device comprises an input device configured with controls for accepting directional input from a user, and
the directional input is transmitted to the recovery unit using the transmitter, and received by the receiver.

Example 8

The system of any preceding Example, wherein the recovery unit comprises a steering mechanism responsive to the controller;
wherein the controller is configured to use the directional input from the tracking device to direct the flotation device using the steering mechanism when the recovery unit is activated.

Example 9

The system of any preceding Example, wherein the tracking device is a personal computing device that includes a processor and a display device.

Example 10

The system of any preceding Example, comprising a housing, wherein the controller, steering mechanism, and propulsion system are mounted to the housing, and wherein the housing is mounted to the flotation device.

Example 11

The system of any preceding Example, wherein the kite, the tracking device, and the flotation device are user wearable devices.

Example 12

A system, comprising a flotation device;
a tracking device having a location finding system configured to determine a location of the tracking device, and a transmitter for transmitting the location of the tracking device;
a recovery unit mounted to the flotation device, comprising a propulsion system configured to propel the flotation device, a steering mechanism operable to steer the flotation device, and a controller coupled the propulsion system, and steering mechanism, the controller configured determine the location of the flotation device, and to activate the propulsion and steering systems when a distance between the flotation device and the tracking device exceeds a threshold limit.
wherein the controller is operable to control the propulsion system to propel the flotation device; and
wherein the controller is operable to control the steering mechanism to direct the flotation device toward the tracking device.

Example 13

The system of Example 12, wherein the tracking device is a personal computing device that includes a processor and a display device.

Example 14

The system of any one of Examples 12 or 13, wherein the tracking device is a user wearable device that includes an attachment element for coupling the tracking device to a user of the flotation device.

Example 15

The system of any one of Examples 12-14, wherein the recovery unit includes a receiver responsive to the controller and an antenna coupled to the receiver, wherein the tracking device includes an antenna, and wherein the transmitter in the tracking is configured to wirelessly send the location of the tracking device to the controller in the recovery unit via the receiver.

Example 16

The system of any one of Examples 12-15, comprising a kite configured for use with the flotation device;
wherein the kite is configured to propel the flotation device when the recovery unit is inactive and the kite is coupled to the flotation device.

Example 17

The system of any one of Examples 12-16, comprising a housing, wherein the steering mechanism, propulsion system, and controller are mounted to the housing, and wherein the housing is mounted to the flotation device.

Example 18

A system, comprising a flotation device;
a kite configured for use with the flotation device;
a tracking device configured to determine its location;
a recovery unit mounted to the flotation device that includes a propulsion system and a controller responsive to the tracking device and coupled to the propulsion system, the controller configured to determine the location of the flotation device, determine the location of the tracking device, calculate a bearing to intercept the tracking device, and control a propulsion system to propel the flotation device toward the tracking device using the bearing.

Example 19

The system of Example 18, wherein the tracking device includes an antenna and a processor, the antenna configured to receive data sent from remote transmitters, and wherein the processor is configured to determine the location of the tracking device by processing the data.

Example 20

The system of Example 18 or 19, wherein the controller is further configured to use the location of the flotation device and the location of the tracking device to determine a range to the tracking device and to activate the recovery unit when the range exceeds a threshold limit.

Example 21

The system of any one of Examples 18-20, wherein the propulsion system includes a first motor, a battery, and a propeller, the battery and the propeller coupled to the first motor.

Example 22

The system of any one of Examples 18-21, wherein the recovery unit comprises a steering mechanism responsive to the controller, wherein the controller controls a direction of travel of the flotation device using the steering mechanism when the propulsion system is activated.

Example 23

The system of any one of Examples 18-22, wherein the steering mechanism includes a first and second motor coupled to at least one propeller, wherein the first and second motors are coupled to a battery; and wherein the controller is configured to selectively control operation of the first and second motors to direct the flotation device along the bearing toward the tracking device.

Example 24

The system of any one of Examples 18-23, wherein the tracking device is a personal computing device that includes a display device.

Example 25

The system of any one of Examples 18-24, wherein the tracking device wirelessly transmits its location to the controller using a Bluetooth protocol.

Example 26

The system of any one of Examples 18-25, wherein the tracking device wirelessly transmits its location to the controller using a Bluetooth wireless networking protocol.

Example 27

The system of any one of Examples 18-27, wherein the tracking device is configured to receive location information from at least one satellite, and wherein the location information is wirelessly transmitted to the controller, and wherein the location information includes at least the following fields: Time, latitude, longitude, fix quality, number of satellites in view, and time since last update.

Example 28

The system of any one of Examples 18-27, wherein the flotation device is a user wearable device that includes one or more retention devices for mounting the flotation device to a user, and wherein the kite is a user wearable device that includes a harness for mounting the kite to the user.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Battery" generally refers to an electrical energy storage device or storage system including multiple energy storage devices. A battery may include one or more separate electrochemical cells, each converting stored chemical energy into electrical energy by a chemical reaction to generate an electromotive force (or "EMF" measured in Volts). An individual battery cell may have a positive terminal (cathode) with a higher electrical potential, and a negative terminal (anode) that is at a lower electrical potential than the cathode. Any suitable electrochemical cell may be used that employ any suitable chemical process, including galvanic cells, electrolytic cells, fuel cells, flow cells and voltaic piles. When a battery is connected to an external circuit, electrolytes are able to move as ions within the battery, allowing the chemical reactions to be completed at the separate terminals thus delivering energy to the external circuit.

A battery may be a "primary" battery that can produce current immediately upon assembly. Examples of this type include alkaline batteries, nickel oxyhydroxide, lithium-copper, lithium-manganese, lithium-iron, lithium-carbon, lithium-thionyl chloride, mercury oxide, magnesium, zinc-air, zinc-chloride, or zinc-carbon batteries. Such batteries are often referred to as "disposable" insofar as they are generally not rechargeable and are discarded or recycled after discharge.

A battery may also be a "secondary" or "rechargeable" battery that can produce little or no current until charged. Examples of this type include lead-acid batteries, valve regulated lead-acid batteries, sealed gel-cell batteries, and various "dry cell" batteries such as nickel-cadmium (NiCd), nickel-zinc (NiZn), nickel metal hydride (NiMH), and lithium-ion (Li-ion) batteries.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station in the receiving station. Logical link may include any combination of physical, electrical, electromagnetic, or other types of communication links.

"Communication node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Flotation device" generally refers to a device configured to float in a fluid, or in other words, configured to displace a volume of the surrounding fluid that weighs at least as much as the device itself. Any suitable materials may be included such as foam, wood, metal, polymeric materials, and the like. A flotation device may include one or more hermetically sealed cavities for retaining a gaseous fluid such as air or nitrogen that may be maintained at a pressure that exceeds the ambient air pressure. Such cavities may be rigid or selectively inflatable or deflatable.

The flotation device may be configured as a user wearable device and may include a harness, straps, stirrups, control lines, or other mechanisms for maintaining the user adjacent or in direct contact with the device. The device may include controls for using or operating the device which may include other aspects such as a propulsion system and steering system.

Examples of a flotation device include any suitable personal flotation device such as a life jacket, life preserver, life belt, "Mae West", life vest, life saver, cork jacket, buoyancy aid, wet suit, or flotation suit. Such devices may be configured to provide buoyancy sufficient to float the device and at least one user in a liquid fluid such as water.

In another example, a flotation device may refer to any of a number of small waterborne craft often used for sports or recreation such as surfboards, kiteboards, wakeboards, windsurfing boards, sail boats, kayaks, canoes, water skis, and the like. Such devices may be configured to float in a liquid fluid such as water and to provide buoyancy for one or more users as well as for the device itself.

In another example, a flotation device may refer to any of a range of different waterborne vehicles with propulsive capability including ships, rafts, boats, hovercraft, and submarines.

"Input Device" generally refers to a device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Kite" generally refers to a tethered heavier-than-air aircraft with wings or other surfaces that can react against moving air to create, for example, lift, drag, pitch, roll, and/or yaw for the wings.

For example, a kite may include one or more wings, tethers and/or anchors. A kite may include a single tether line fixed to an object, to the ground, or held by a person. A kite may also include multiple tether lines coupled to various locations along the wings or other surfaces of the kite. This may allow the operator to perform maneuvers such as steering the kite. Such a kite may have a steering assembly to which the multiple tether lines may be attached. By moving the steering assembly relative to the kite, the operator may guide the face of the kite at varying angles relative to the air moving past the kite to increase or decrease lift, change its direction of travel, and the like. The steering assembly and the multiple tether lines maybe shifted toward the user, away from the user, or rotated relative to the kite, to the tether lines, and/or to gravity, etc. to affect changes in the kite's behavior while flying.

The lift that sustains a kite in flight may be generated when air flows around the kite's surfaces, producing a relatively lower air pressure above and higher air pressure below the wings or other surfaces. Such flight may produce horizontal drag along the direction of the wind. A resultant force vector from the lift and drag forces components may be opposed by tension in one or more of the lines or tethers to which the kite is attached. The anchor point of the kite line may be static or moving. A kite may be anchored to a person, a boat or flotation device, anchored to a free-falling anchor such as in the case of paragliders, or to a vehicle that is stationery or moving.

"Location Finding System" or "locator" generally refers to a system that tracks the location of objects or people in real time. Such systems include space based systems like the Global Positioning System (GPS) which may use a receiver on earth in communication with multiple satellite mounted transmitters in space. Such systems may use time and the known position of the satellites to triangulate a position on earth. The satellites may include accurate clocks that are synchronized to each other and to ground clocks. The satellites may be configured to continuously transmit their current time and position. The ground-based receiver may monitor multiple satellites solving equations in real time to determine the precise position of the receiver. Signals from four satellites may be required for a receiver to make the necessary computations.

In another example sometimes referred to as "Real-time Locating Systems" (RTLS), wireless tags are attached to objects or worn by people. Receivers maintained at known, fixed reference points may receive wireless signals from the tags and use signal strength information to determine their location.

The tags may communicate using electromagnetic energy which may include radio frequency (RF) communication, optical, and/or acoustic technology instead of or in addition to RF communication. Tags and fixed reference points can be transmitters, receivers, or both. Location information may or may not include speed, direction, or spatial orientation, and may in some cases be limited to tracking locations of objects within a building or contained area.

Wireless networking equipment may be engaged as well. In one example, known signal strength readings may be taken in different locations serviced by a wireless network such as in 802.11 Wi-Fi network. These known signal strength readings may be used to calculate or triangulate approximate locations by comparing measured signal strength received from a tag against a stored database of Wi-Fi readings or Received Signal Strength Indicators (RSSI). In this way, one or more probable locations may be indicated a virtual map.

In another example, a wireless network transmitter may be configured to send reference signal strength information in packets or datagrams received by the tags. The tags may be configured to measure and/or calculate the actual signal strength of the signal received from the sending transmitter and compare this actual signal strength to reference signal strength information to determine an approximate distance from the transmitter. This distance information may then be sent to other servers or components in the location finding system and used to triangulate a more precise location for a given tag.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11

(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eye glasses, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qalcomm of San Diego, Calif., USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Propeller" generally refers to a device arranged and configured to transmit power to a fluid (which may or may not be a liquid) by converting rotational motion along a rotational axis into thrust. The rotational axis of the propeller may be substantially parallel to the thrust vector created by the propeller, or it may be substantially perpendicular to the rotational axis. The rotational axis may also be substantially perpendicular to gravity, or substantially horizontal, or any suitable angle between.

In one example, a propeller rotates on an axis that is substantially parallel to the direction of fluid motion to create a pressure difference between the forward and rear surfaces of one or more blades. Such blades may be airfoil-shaped so that a fluid (such as air or water) is accelerated behind the blade. Such a propeller may be used for boats or other marine vehicles and may be commonly referred to as a "screw propeller" or "screw."

In another example, a "propeller" may be a "cycloidal propeller" which generally refers to a fluid propulsion device that converts shaft power into the acceleration of a fluid using a rotating axis perpendicular to the direction of fluid motion. Such a propeller may use several blades with a spanwise axis parallel to the axis of rotation and perpendicular to the direction of fluid motion. These blades may be cyclically pitched twice per revolution to produce force (thrust or lift) in any direction normal to the axis of rotation.

"Propulsion System" generally refers to a system configured to produce thrust in a particular direction along a thrust vector to propel an object in the direction of the thrust vector. A propulsion system may be configured to generate multiple thrust vectors that together combine to form a resulting overall thrust vector. Thrust may be generated by any suitable means such as by accelerating a gas or a liquid in a direction that is generally opposite the thrust vector, or by translating motion and energy expended within the propulsion system to forward thrust via mechanical means such as with the combination of an internal combustion engine, transmission, and wheels, or in the case of a battery, electrical motor, and propeller in a boat or other marine vehicle.

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiver" generally refers to a device configured to receive, for example, digital or analog signals carrying information via electromagnetic energy. A receiver using electromagnetic energy may operate with an antenna or antenna system to intercept electromagnetic waves passing through a medium such as air, a conductor such as a metallic cable, or through glass fibers. A receiver can be a separate piece of electronic equipment, or an electrical circuit within another electronic device. A receiver and a transmitter combined in one unit are called a "transceiver".

A receiver may use electronic circuits configured to filter or separate one or more desired radio frequency signals from all the other signals received by the antenna, an electronic amplifier to increase the power of the signal for further processing, and circuits configured to demodulate the information received.

Examples of the information received include sound (an audio signal), images (a video signal) or data (a digital signal). Devices that contain radio receivers include television sets, radar equipment, two-way radios, cell phones and other cellular devices, wireless computer networks, GPS navigation devices, radio telescopes, Bluetooth enabled devices, garage door openers, and/or baby monitors.

"Rule" generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if(clouds.areGrey( ) and
(clouds.numberOfClouds > 100)) then
{
    prepare for rain;
} else {
    Prepare for sunshine;
}
```

"Steering System" generally refers to a system, mechanism, or device having any suitable collection of components, linkages, sensors, controllers, motors, and the like which are configured to direct a vehicle to follow a desired course or to move in a desired direction of travel. The steering system may include a guide for aiding in the steering process. Such a guide may be electronic or electromagnetic such as in the case of a radio beacon, or mechanical such as in the case of rails which provide steering for a train. A steering system may receive inputs regarding changes in direction from a user or operator, or controlled automatically by a computer or other controller which may be separate and/or remote from the steering system, or included with the steering system.

A steering system may operate in conjunction with a propulsion system, or be integrated into the propulsion system. For example, a boat or other flotation device may include a propulsion system having a single propeller creating thrust, and a single control surface such as a rudder configured to redirect the boat by changing the direction of the flow of water moving past the flotation device.

In another example, a steering system may be integrated with the propulsion system such as in the case of an aircraft with rotatable engine and propeller units, or in the case of a craft having a jet engine or a waterjet configured to redirect thrust created by the engine according to the desired direction of travel.

In another example a steering system may be integrated with the propulsion system such that changes in direction are achieved by varying thrust or driving power. For example, a vehicle such as a bulldozer or "skid steer" loader may be steered by varying the propulsion system to increase or decrease the speed of one wheel or track relative to another, usually on the opposite side of the machine. Similarly, a boat or other flotation device having two or more propellers on opposing sides of the boat may be directed by varying the rotational speed and/or direction of propellers on one side of the boat versus the other. This may be accomplished by varying the rotational speeds of various drive motors in the case where the propulsion system has more than one drive motor.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

Information such as a signal provided to the transmitter may be encoded or modulated by the transmitter using various digital or analog circuits. The information may then be transmitted. Examples of such information include sound (an audio signal), images (a video signal) or data (a digital signal). Devices that contain radio transmitters include radar equipment, two-way radios, cell phones and other cellular devices, wireless computer networks and network devices, GPS navigation devices, radio telescopes, Radio Frequency Identification (RFID) chips, Bluetooth enabled devices, and garage door openers.

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

"User wearable device" generally refers to a device that is operable or configured to be worn by a human being or animal. Such a device may be worn or otherwise coupled to the user in any suitable manner such as on an appendage (e.g. a hat, wristband, bracelet, necklace, or armband), as an article of clothing covering some portion of the body (e.g. a jacket or vest), or as a harness, to name a few non-limiting examples. User wearable devices may include one or more retention members configured to interface with some area of the user's body in order to retain the device on the user. Such retention members may include or be constructed entirely of any suitable materials. Examples of such retention members include straps, stirrups, belts, harnesses, cuffs, ropes, and the like, and may be rigid, semi-rigid, or flexible.

What is claimed is:

1. A system, comprising:
   a flotation device;
   a kite configured for use with the flotation device;
   a tracking device comprising:
      a tracking device locator configured to determine a first location for the tracking device; and
      a transmitter configured to transmit the first location;
   a recovery unit mounted to the flotation device, the recovery unit comprising:
      a receiver responsive to the transmitter and configured to receive the first location from the transmitter;
      a recovery system locator configured to determine a second location for the flotation device;
      a propulsion system responsive to the controller that includes a first motor, a battery, and a propeller, the battery and the propeller coupled to the first motor,
      a controller coupled to the receiver and the recovery system locator, the controller having a processor, wherein the controller is configured to use the first and second locations to activate the propulsion system and steering mechanism of the recovery unit when the controller determines that a range to the first location from the second location exceeds a threshold limit,
      wherein the propulsion system is configured to propel the flotation device when activated by the controller.

2. The system of claim 1, wherein the recovery unit comprises:
   a steering mechanism responsive to the controller;
   wherein the controller uses the first and second locations to determine a direction of travel for the flotation device from the second location to the first location when the recovery unit is activated; and
   wherein the controller controls a steering device in accordance with the direction of travel.

3. The system of claim 2, wherein the recovery unit comprises:
   a propulsion system responsive to the controller that includes a motor, a battery, and a propeller, the battery and the propeller coupled to the motor;
   wherein the propulsion system is configured to propel the flotation device toward the first location when the recovery unit is activated.

4. The system of claim 1, wherein the propulsion system comprises:
   a second motor coupled to the battery and to a second propeller;
   wherein the controller is configured to separately control the first motor and the second motor to steer the flotation device toward the first location.

5. The system of claim 1, wherein the controller is configured to control a rotational speed of the first motor.

6. The system of claim 1, wherein:
   the tracking device comprises an input device configured with controls for accepting directional input from a user; and
   the directional input is transmitted to the recovery unit using the transmitter, and received by the receiver.

7. The system of claim 6, wherein the recovery unit comprises:
   a steering mechanism responsive to the controller;
   wherein the controller is configured to use the directional input from the tracking device to direct the flotation device using the steering mechanism when the recovery unit is activated.

8. The system of claim 6, wherein the tracking device is a personal computing device that includes a processor and a display device.

9. The system of claim 3, comprising:
a housing, wherein the controller, steering mechanism, and propulsion system are mounted to the housing, and wherein the housing is mounted to the flotation device.

10. The system of claim 1, wherein the kite, the tracking device, and the flotation device are user wearable devices.

11. A system, comprising:
a flotation device;
a tracking device having a location finding system configured to determine a location of the tracking device, and a transmitter for transmitting the location of the tracking device;
a recovery unit mounted to the flotation device, comprising:
a propulsion system configured to propel the flotation device;
a steering mechanism operable to steer the flotation device; and
a controller coupled to the propulsion system, and steering mechanism, the controller configured determine the location of the flotation device, and to activate the propulsion and steering systems when a distance between the flotation device and the tracking device exceeds a threshold limit;
wherein the controller is operable to control the propulsion system to propel the flotation device; and
wherein the controller is operable to control the steering mechanism to direct the flotation device toward the tracking device.

12. The system of claim 11, wherein the tracking device is a personal computing device that includes a processor and a display device.

13. The system of claim 11, wherein the tracking device is a user wearable device that includes an attachment element for coupling the tracking device to a user of the flotation device.

14. The system of claim 11, wherein the recovery unit includes a receiver responsive to the controller and an antenna coupled to the receiver;
wherein the tracking device includes an antenna; and
wherein the transmitter in the tracking is configured to wirelessly send the location of the tracking device to the controller in the recovery unit via the receiver.

15. The system of claim 11, comprising:
a kite configured for use with the flotation device;
wherein the kite is configured to propel the flotation device when the recovery unit is inactive and the kite is coupled to the flotation device.

16. The system of claim 11, comprising:
a housing, wherein the steering mechanism, propulsion system, and controller are mounted to the housing, and wherein the housing is mounted to the flotation device.

17. A system, comprising:
a flotation device;
a kite configured for use with the flotation device;
a tracking device configured to determine its location;
a recovery unit mounted to the flotation device that includes a propulsion system and a controller responsive to the tracking device and coupled to the propulsion system, the controller configured to:
determine the location of the flotation device;
determine the location of the tracking device;
calculate a bearing to intercept the tracking device; and
control the propulsion system to propel the flotation device toward the tracking device using the bearing.

18. The system of claim 17, wherein the tracking device includes an antenna and a processor, the antenna configured to receive data sent from remote transmitters, and wherein the processor is configured to determine the location of the tracking device by processing the data.

19. The system of claim 17, wherein the controller is further configured to:
use the location of the flotation device and the location of the tracking device to determine a range to the tracking device and to activate the recovery unit when the range exceeds a threshold limit.

20. The system of claim 17, wherein the propulsion system includes a first motor, a battery, and a propeller, the battery and the propeller coupled to the first motor.

21. The system of claim 17, wherein the recovery unit comprises:
a steering mechanism responsive to the controller, wherein the controller controls a direction of travel of the flotation device using the steering mechanism when the propulsion system is activated.

22. The system of claim 21, wherein the steering mechanism includes a first and second motor coupled to at least one propeller, wherein the first and second motors are coupled to a battery; and wherein the controller is configured to selectively control operation of the first and second motors to direct the flotation device along the bearing toward the tracking device.

23. The system of claim 18, wherein the tracking device is a personal computing device that includes a display device.

24. The system of claim 17, wherein the tracking device wirelessly transmits its location to the controller using a Bluetooth protocol.

25. The system of claim 17, wherein the tracking device wirelessly transmits its location to the controller using a Bluetooth wireless networking protocol.

26. The system of claim 17, wherein the tracking device is configured to receive location information from at least one satellite, and wherein the location information is wirelessly transmitted to the controller, and wherein the location information includes at least the following fields: Time, latitude, longitude, fix quality, number of satellites in view, and time since last update.

27. The system of claim 17, wherein the flotation device is a user wearable device that includes one or more retention devices for mounting the flotation device to a user, and wherein the kite is a user wearable device that includes a harness for mounting the kite to the user.

* * * * *